(12) United States Patent
Liu

(10) Patent No.: US 6,641,441 B2
(45) Date of Patent: Nov. 4, 2003

(54) ELECTRONIC CARD CONNECTOR HAVING IMPROVED ASSEMBLY

(75) Inventor: Li Qi Liu, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 12 days.

(21) Appl. No.: 10/104,787

(22) Filed: Mar. 22, 2002

(65) Prior Publication Data

US 2003/0119364 A1 Jun. 26, 2003

(51) Int. Cl.[7] .............................................. H01R 24/00
(52) U.S. Cl. ...................................................... 439/630
(58) Field of Search ................................. 439/630, 904, 439/929, 928.1, 331, 946, 946.2, 634, 326

(56) References Cited

U.S. PATENT DOCUMENTS

| | | | | |
|---|---|---|---|---|
| 5,452,179 A | * | 9/1995 | Sasaki ......................... 361/685 |
| 5,563,400 A | * | 10/1996 | Le Roux ...................... 235/486 |
| 5,603,629 A | * | 2/1997 | DeFrasne et al. ............ 439/331 |
| 5,673,180 A | * | 9/1997 | Pernet ......................... 361/756 |
| 5,846,092 A | * | 12/1998 | Feldman et al. ............. 439/76.1 |
| 6,053,748 A | * | 4/2000 | Bricaud et al. .............. 439/76.1 |
| 6,183,294 B1 | * | 2/2001 | Fan et al. ..................... 439/567 |
| 6,241,545 B1 | * | 6/2001 | Bricaud et al. .............. 439/326 |
| 6,392,879 B1 | * | 5/2002 | Chien .......................... 361/685 |

\* cited by examiner

*Primary Examiner*—Tho D. Ta
*Assistant Examiner*—James R. Harvey
(74) *Attorney, Agent, or Firm*—Wei Te Chung

(57) ABSTRACT

An electronic card connector (1) for electrically connecting an electronic card to a printed circuit board (PCB) includes a dielectric housing (10) including a bottom wall (14), a contact module (20) having a dielectric base (21) receiving a plurality of conductive contacts (22) and a pair of eaves (212) protruding laterally from two opposite sides of the base. A through opening (11) is defined in the bottom wall and a pair of holding steps (12) protrude inwardly from two opposite sides of the opening. The contact module is embedded in the opening of the housing, the two eaves respectively supported on the pair of holding steps and the base falling into the opening.

1 Claim, 3 Drawing Sheets

ELECTRONIC CARD CONNECTOR HAVING IMPROVED ASSEMBLY

FIELD OF THE INVENTION

The present invention generally relates to an electronic card connector, and in particular to an electronic card connector having an improved assembly.

BACKGROUND OF THE INVENTION

An electronic card in a cellular phone is typically used for billing and security. The electronic card may also be used for storing operational data such as a phone book and/or quick dial numbers. An electronic card connector is adapted to connect an electronic card with a cellular phone, so that processing units in the phone can access information stored in the electronic card. A conventional electronic card connector generally includes a dielectric housing and a plurality of conductive contacts assembled with the housing by insert molding.

However, a problem of such structures is that if the housing is deformed, the structure of the contacts will be affected. For example, when the electronic card connector is mounted to a printed circuit board (PCB) by surface mounting technology (SMT), the housing is heated and deformed, which brings about unreliable soldering between the contacts and the PCB. Furthermore, if the arrangement and/or the number of the contacts is adjusted by a designer, the whole electronic card connector must be remade, which increases the manufacturing cost of the connector.

Hence, an electronic card connector with an improved assembly is required to overcome the disadvantages of the prior art.

BRIEF SUMMARY OF THE INVENTION

A main object, therefore, of the present invention is to provide an electronic card connector having a reliable assembly of a housing and a plurality of contacts.

Another object is to provide an electronic card connector having an improved assembly to decrease the manufacturing cost of the connector.

An electronic card connector according to the present invention for electrically connecting an electronic card to a printed circuit board (PCB) includes a dielectric housing including a bottom wall, a contact module having a dielectric base receiving a plurality of conductive contacts and a pair of eaves protruding laterally from two opposite sides of the base.

A through opening is defined in the bottom wall and a pair of holding steps protrude inwardly from two opposite sides of the opening. The contact module is embedded in the opening of the housing, the two eaves respectively supported on the pair of holding steps and the base falling into the opening. The contact module is separated from the housing and assembled with the housing afterwardly, so the structure of the contacts are not affected by the housing. Furthermore, just remaking the contact module could adapt the connector for a different electronic card, instead of remaking the whole connector Other objects, advantages and novel features of the invention will become more apparent from the following detailed description when taken in conjunction with the accompanying drawings.

DETAILED DESCRIPTION OF THE INVENTION

Reference will now be made in detail to a preferred embodiment of the present invention.

Figure 1:
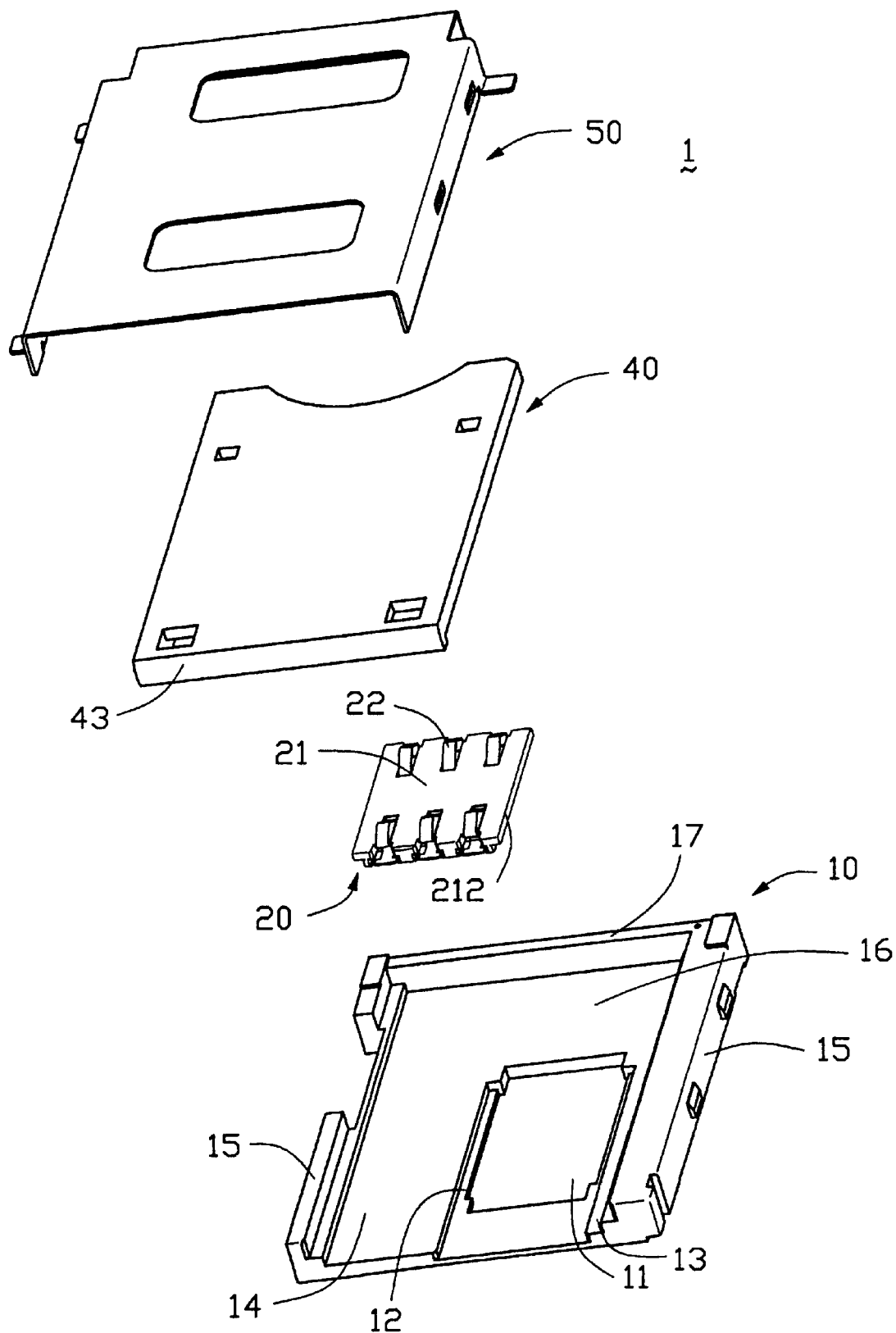
FIG. 1 is an exploded view of an electronic card connector according to the present invention.
Figure 2:
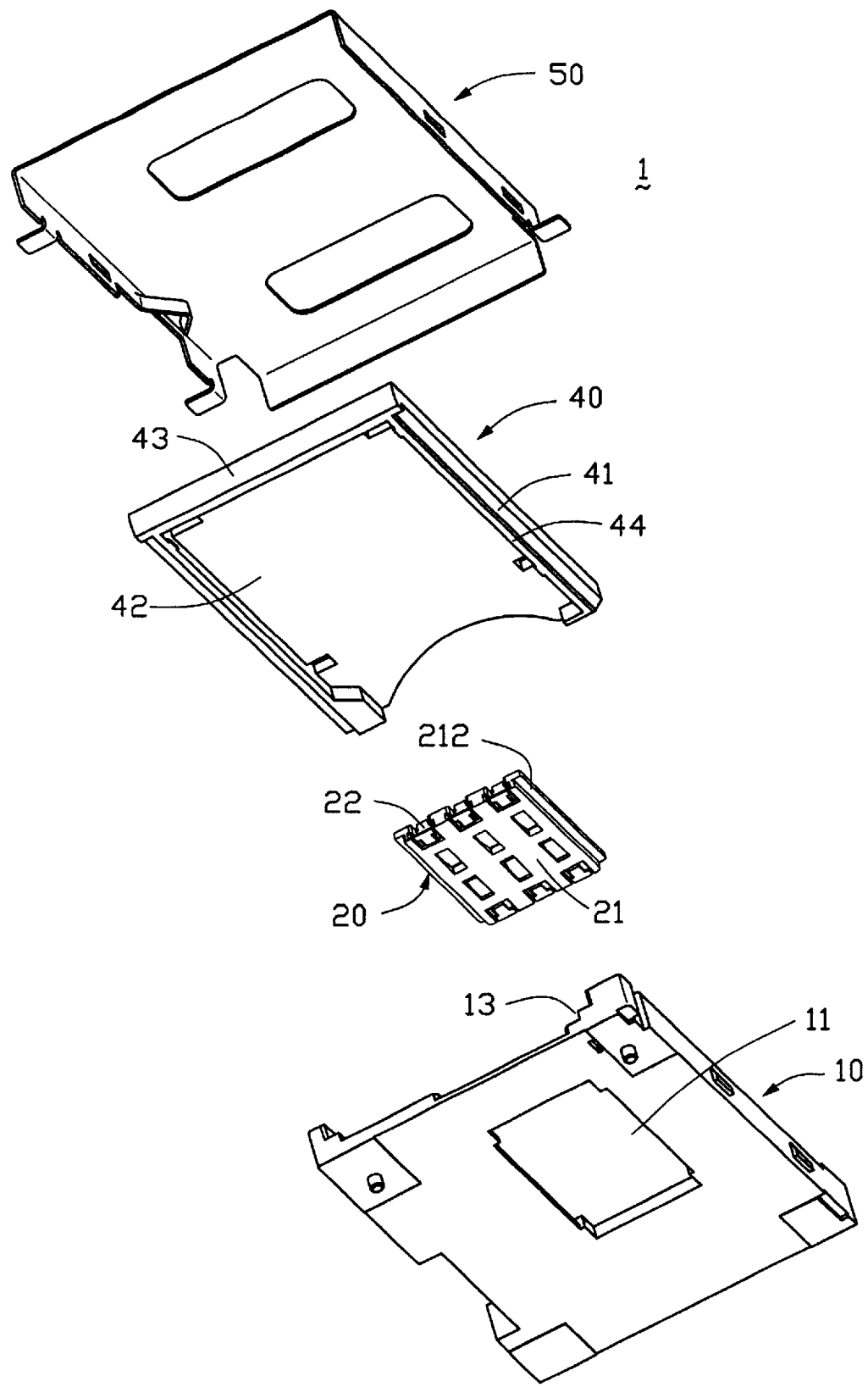
FIG. 2 is another exploded view of the electronic card connector of FIG.

Referring to the drawings and particularly to FIGS. 1 and 2, an electronic card connector 1 in accordance with the present invention comprises a dielectric housing 10, a contact module 20, a dielectric tray 40 and a conductive shell 50.

The dielectric housing 10 comprises a rectangular bottom wall 14, a pair of side walls 15 protruding respectively from two opposite sides of the bottom wall 14, and a rear wall 17. A receiving space 16 is defined by the bottom wall 14, the side walls 15 and the rear wall 17. A pair of ribs 13 are respectively formed on inner sides of the two side walls 15. A substantially rectangular through opening 11 is defined in the bottom wall 14. A pair of holding steps 12 protrude inwardly from two opposite sides of the opening 11.

The contact module 20 comprises a dielectric base 21 and a plurality of contacts 22 assembled in the base 21 by conventional way. A pair of first eaves 212 protrude laterally from two opposite sides of the base 21.

The tray 40 is rectangular in shape and includes a coping 42, a pair of side walls 44 protruding downwardly from opposite sides of the coping 42 and a front bar 43. A pair of second eaves 41 protrude laterally from the two opposite sides of the coping 42. A receiving chamber (not labeled) is defined between the coping 42, the side walls 44 and the front bar 43 to receive an electronic card (not shown).

Figure 3:
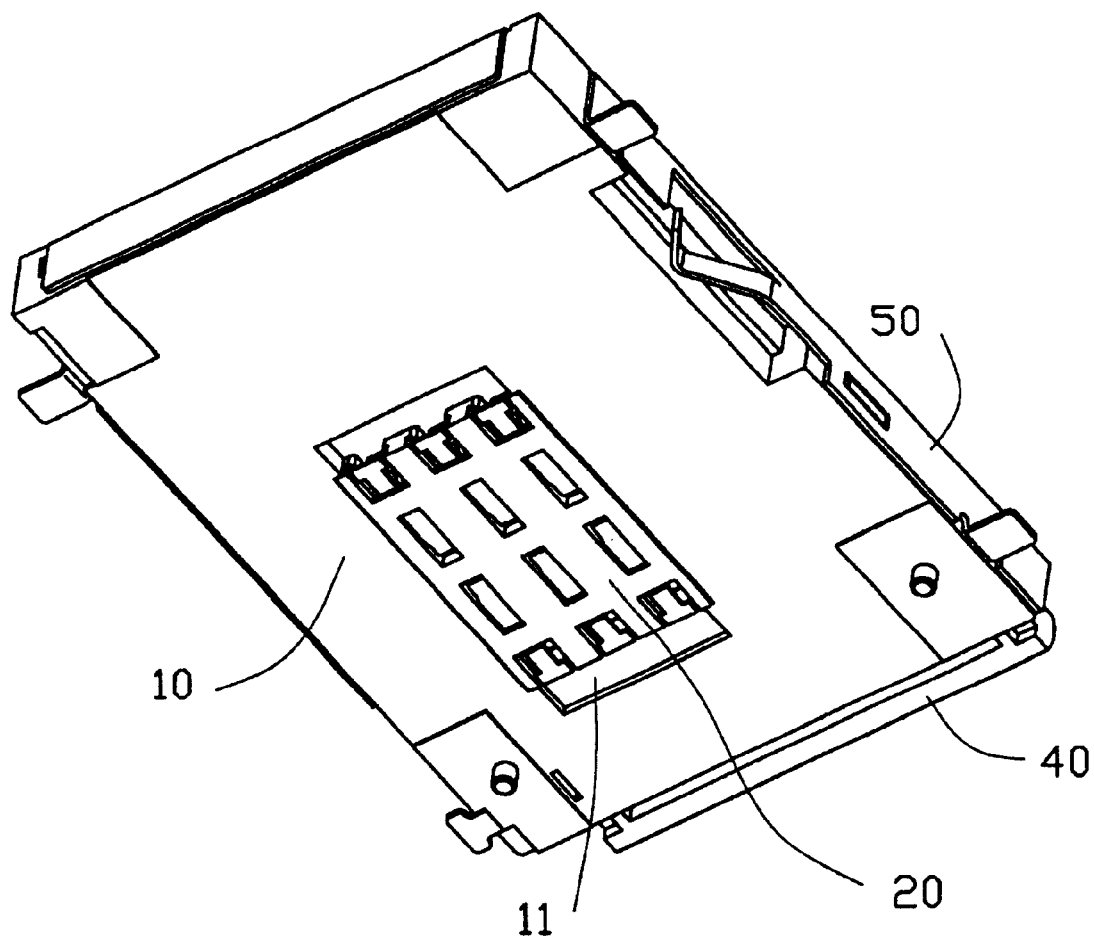
FIG. 3 is an assembled view of the electronic card connector of FIG. 1.

Referring to FIGS. 3 and 4, in assembly, the contact module 20 is embedded in the opening 11 of the housing 10, wherein the two first eaves 212 are respectively supported on the pair of holding steps 12 and the base 21 completely falls into the opening 11. The tray 40 is moveable mounted in the receiving space 16 of the housing 10, wherein the two second eaves 41 respectively engage with the two ribs 13. The shell 50 engages with a top surface of the housing 10 to hold the tray 40 therein, which is known in the prior art so more detailed structure and assembly of the shell 50 are not described here.

In use, the housing 10 is mounted on a printed circuit board (PCB) (not shown). The contact module 20 is embedded in the opening 11 of the housing 10, the contacts 22 extending downwardly to contact with corresponding circuit traces on the PCB. The electronic card is put in the receiving chamber of the tray 40 and the tray 40 is pushed into the housing 10 to make the card electrically connect with the contacts 22.

The contact module 20 is separated from the housing 10 and assembled with the housing 10 afterwardly, so the structure of the contacts 22 are not affected by the housing 10. Furthermore, simply remaking the contact module 20 could adapt the connector 1 for a different electronic card, instead of remaking the whole connector 1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector comprising:
   a dielectric housing including a bottom wall, a through opening defined in the bottom wall;
   a discrete contact module having a dielectric base retaining a plurality of contacts thereto and embedded within said through opening with said contacts exposed to an exterior for mounting to a printed circuit board under the housing;
   a conductive shell attached to a top surface of the housing and cooperating with the housing to define a receiving space there between; and
   a tray moveably received in said receiving space and defining therein a receiving channel open to said contact module for receiving an IC card to mechanically and electrically connect to said contact module;
   wherein deformation of the housing will not integrally influence the contact module;
   wherein the dielectric housing is not integrally formed with the dielectric base while being supportably engaged therewith;
   wherein a pair of holding steps protruding inwardly from two opposite sides of the opening; and
   wherein a pair of eaves protruding laterally from two opposite sides of the base,
   wherein the two eaves respectively supported on the pair of holding steps and the base falling into the opening.

* * * * *